United States Patent
Colaianna et al.

(10) Patent No.: US 10,246,572 B2
(45) Date of Patent: Apr. 2, 2019

(54) FOAMABLE FLUOROPOLYMER COMPOSITIONS

(75) Inventors: Pasqua Colaianna, Milan (IT); Giambattista Besana, Mariano Comense (IT); Emanuele Di Nicolo, Paderno Dugnano (IT); Letanzio Bragante, Due Carrare (IT); Giuseppe Marchionni, Milan (IT); Giulio Brinati, Milan (IT)

(73) Assignee: SOLVAY SPECIALTY POLYMERS ITALY S.P.A., Bollate (MI) (IT)

( * ) Notice: Subject to any disclaimer, the term of this patent is extended or adjusted under 35 U.S.C. 154(b) by 43 days.

(21) Appl. No.: 13/993,331

(22) PCT Filed: Dec. 9, 2011

(86) PCT No.: PCT/EP2011/072260
§ 371 (c)(1),
(2), (4) Date: Jun. 12, 2013

(87) PCT Pub. No.: WO2012/080098
PCT Pub. Date: Jun. 21, 2012

(65) Prior Publication Data
US 2013/0267618 A1    Oct. 10, 2013

(30) Foreign Application Priority Data
Dec. 16, 2010 (EP) ..................... 10195442

(51) Int. Cl.
*C08K 5/42*    (2006.01)
*C08J 9/00*    (2006.01)

(52) U.S. Cl.
CPC ............... *C08K 5/42* (2013.01); *C08J 9/0019* (2013.01); *C08J 2327/12* (2013.01)

(58) Field of Classification Search
None
See application file for complete search history.

(56) References Cited

U.S. PATENT DOCUMENTS

| | | | |
|---|---|---|---|
| 4,029,868 A | 6/1977 | Carlson | |
| 4,877,815 A | 10/1989 | Buckmaster et al. | |
| 5,023,279 A | 6/1991 | Buckmaster et al. | |
| 5,610,203 A * | 3/1997 | Buckmaster | C08J 9/0066 521/143 |
| 5,677,404 A | 10/1997 | Blair | |
| 5,688,885 A | 11/1997 | Blair | |
| 5,703,185 A | 12/1997 | Blair | |
| 7,241,826 B2 * | 7/2007 | Shiotsuki | C08J 9/0066 524/404 |
| 2008/0149899 A1 * | 6/2008 | Venkataraman | C08J 9/0066 252/500 |
| 2010/0120980 A1 | 5/2010 | Peng et al. | |

FOREIGN PATENT DOCUMENTS

| EP | 0466483 A1 | 1/1992 |
|---|---|---|
| JP | 64-65113 A | 3/1989 |
| WO | WO 2007122217 A1 | 11/2007 |

OTHER PUBLICATIONS

Alger, M. S.M.,—"Polymer Science Dictionary", 1989, London School of Polymer Technology, Polytechnic North London, UK published by Elsevier Science Publishers Ltd, p. 476; 3 pgs.

* cited by examiner

*Primary Examiner* — Kara B Boyle

(57) ABSTRACT

The invention pertains to foamable thermoplastic fluoropolymer composition comprising:
  at least one fluoropolymer [polymer (A)]; and
  at least one perfluoroalkoxysulphonic derivative of either of formulae:

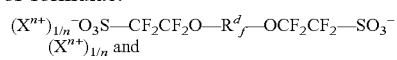
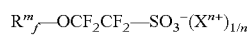

wherein $R^d_f$ is a divalent $C_1$-$C_{12}$ perfluorocarbon group, possibly comprising one or more ethereal oxygen atom; $R^m_f$ is a monovalent $C_1$-$C_{12}$ perfluorocarbon group, possibly comprising one or more ethereal oxygen atom, optionally comprising heteroatoms, generally selected from S, N, P; X=H, a metal cation, or an ammonium group; n is the valence of the cation X, preferably 1 or 2.

15 Claims, 1 Drawing Sheet

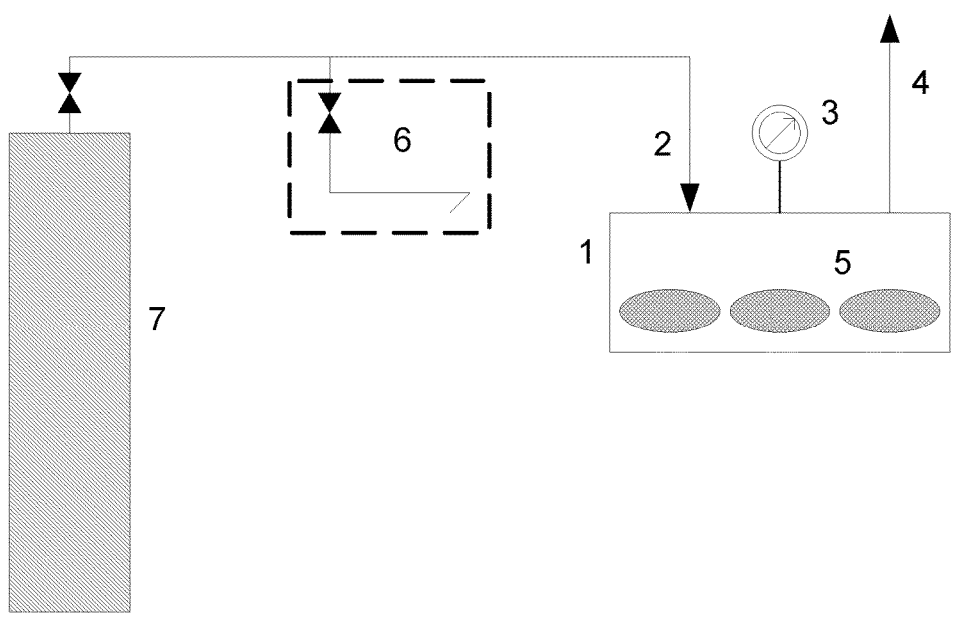

FOAMABLE FLUOROPOLYMER COMPOSITIONS

CROSS-REFERENCE TO RELATED APPLICATIONS

This application is a U.S. national stage entry under 35 U.S.C. § 371 of International Application No. PCT/EP2011/072260 filed Dec. 9, 2011, which claims priority to European application No. EP 10195442.8 filed on Dec. 16, 2011, the whole content of this application being incorporated herein by reference for all purposes.

TECHNICAL FIELD

This invention relates to the use of a special class of perfluoroether sulphonic acid and salts, to give improved nucleation for foam extrusion of thermoplastic fluoropolymers, in particular per(halo)fluoropolymers, using either dissolved gas or chemical blowing agents to produce foam.

BACKGROUND ART

Blowing of fluoropolymers, in particular of perfluoropolymers, is a well assessed technique used in particular for enhancing insulation properties in cable sheathing applications, while targeting light-weighting and substantial reduction of potentially flammable material.

Foaming of fluoropolymers is generally achieved through physical foaming, i.e. by introducing suitable gaseous components, generally referred to as blowing agents, in the molten mass of polymer, or by chemical foaming, i.e. submitting to heat treatment a composition comprising said fluoropolymers and a chemical reagent able to decompose yielding volatile decomposition products, so as to simultaneously melt the polymer and in situ generate the blowing agent.

In both these approaches, the use of a nucleating agent is considered as crucial for achieving homogeneous and regular formation of cells generated by the blowing agent. The use of nucleating agents generally results in a greater number of finer cells than would form without a nucleating agent.

Thus, U.S. Pat. No. 5,023,279 (DU PONT [US]) 11 Jun. 1991 discloses nucleating agents for foaming fluoropolymers selected from free acids or salts of partially or totally fluorinated aliphatic sulphonic or phosphonic acids, which optionally may contain, inter alia, ether oxygen, in particular complying with general formula: $Z(CF_2)_x(CF_2CFX)_p(R')_y(CH_2)_zRO_3]_nM$ wherein Z is $CCl_3$, $CCl_2H$, H, F, Cl or Br;
each of X is selected from H, F, $C_l$ and $CF_3$;
R is S or P;
M is H or a metallic, ammonium, substituted ammonium or quaternary ammonium cation;
x is an integer between 0 and 20;
p is an integer between 0 and 6;
y is 0 or 1;
z is an integer between 0 and 20;
x+y+z+p is an integer or if zero, Z is $CCl_3$ or $CCl_2H$;
n is the valence of M; and
R' is a $C_{5-6}$ alicyclic ring diradical;
a $C_{1-16}$ perfluorinated aliphatic polyether radical;
a substituted or unsubstituted aromatic diradical.

Among suitable compounds useful as nucleating agents, mention is made, in a long list of:

salts of telomer sulphonic acids of formula: $F(CF_2)_n$—$CH_2CH_2SO_3X$, with n=6, 8, 10, 12 (which are preferred embodiments);
salts of perfluoroalkyl sulphonic acids;
Ba salt of perfluoro(2,5-dimethyl)-3,6-dioxamidecanoate: $C_7F_{15}OCF(CF_3)$ $CF_2OCF(CF_3)COOX$
Ba salt of perfluoro-3,5,7,9,11,13-hexaoxatetradecanoate: $CF_3OCF_2OCF$ $2OCF_2OCF_2OCF_2OCF_2COOX$.

Similarly, U.S. Pat. No. 5,610,203 (DU PONT [US]) 11 Mar. 1997 discloses the use of compounds of formula $Z(CF_2)_x(CF_2CFX)_p(R)_y(CH_2)_zRO_3]_nM$ as nucleating agents in perfluoropolymers. All working embodiments are based on the use of Barium salts of mixture of perfluoroalkylethane sulfonic acids.

Thus, in the wide class of compounds described in above referred references, most of actual working embodiments are based either on fluorotelomer sulphonates, perfluoroalkyl sulphonates or on carboxylates.

While perfluoroalkylsuplhonates and fluorotelomer sulphonates (possibly degrading towards fluoroalkyl-containing derivatives) have raised or are currently raising environmental concerns, carboxylate derivatives have been found inappropriate for withstanding certain high temperature processing conditions, when used as nucleating agents.

There is thus a current shortfall in the art for the identification of alternative nucleating agents for fluoropolymers, which possess a better environmental profile, which are endowed with adequate thermal and chemical stability and which provide for outstanding behaviour in foaming, yielding high void fraction and thus low apparent densities of foamed material and regular cell distribution.

On the other side, fluorinated sulfonic acid derivatives comprising oxygen atoms in side chains are known in the art.

Also, US 2010120980 (DU PONT) 13 May 2010 discloses certain sulphonic compounds of formula:

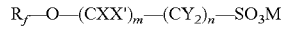

with $R_f$ $C_{1-4}$ perfluoroalkyl;
X, X' H or F, provided at least one of them being F;
Y being H or F;
m=1-4;
n=1-2
M=H, $NH_4$, Li, Na or K.

Preferred and exemplified embodiments are those wherein Y=H and n=2 (i.e. telomers). These compounds are taught as suitable for several field of use, including, notably as foaming agents; no mention is made of their use as nucleating agents, in particular as nucleating agents for perfluoropolymers.

Similarly, EP 0466483 A (AUSIMONT SPA [IT]) 15 Jan. 1992 discloses a process for manufacturing perfluoroalkoxysulphonic compounds of formula: $(R_{f2}CF_2$—$SO_2X)_p$. No mention is made in this document of the use of such compounds as nucleating agents for foaming perfluoropolymers.

Finally, JP 1065113 (ASHAI GLASS CO LTD) 10 Mar. 1989 discloses a molded product which is excellent in heat resistance and elongation characteristics, by using a specified diaminobenzene derivative as a chain extender in the reaction injection molding of a high-MW active hydrogen compound and a polyisocyanate. A starting material comprising said chain extender, a high-MW active hydrogen compound and optionally added another chain extender, catalyst, foaming agent, etc. and another starting material comprising a polyisocyanate compound (e.g., tolylene diisocyanate) are submitted to reaction injection molding to give a synthetic resin molding.

BRIEF DESCRIPTION OF DRAWINGS

FIG. 1 shows a schematic sketch of the experimental apparatus used for bench scale foaming testing of the foamable compositions of the invention.

DESCRIPTION OF EMBODIMENTS

This invention now resides in a foamable thermoplastic fluoropolymer composition containing as a nucleating agent a nucleating-effective amount of at least one compound which is thermally stable at the melt temperature of the extrusion and is selected from certain perfluoroalkoxysulphonic derivatives, as detailed below, which compositions significantly and advantageously enhance foam nucleation, as evidenced by smaller foam cells, higher foam void contents, and/or greater uniformity of cell size.

More precisely, the invention pertains to a foamable thermoplastic fluoropolymer composition comprising:
- at least one melt-processable fluoropolymer [polymer (A)]; and
- at least one perfluoroalkoxysulphonic derivative of either of formulae:

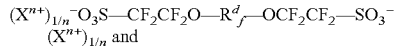

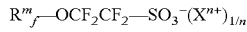

wherein $R^d_f$ is a divalent $C_1$-$C_{12}$ perfluorocarbon group, possibly comprising one or more ethereal oxygen atom; $R^m_f$ is a monovalent $C_1$-$C_{12}$ perfluorocarbon group, possibly comprising one or more ethereal oxygen atom; X=H, a metal cation, or an ammonium group; n is the valence of the cation X, preferably 1 or 2.

The Applicant has found that the perfluoroalkoxysulphonic derivatives as above mentioned, which are endowed with more favourable environmental profile thanks to the presence of their γ-oxygen atoms with respect to the sulphonic group, by means of the linear —$CF_2CF_2$— bridging group, are effective in providing foamable fluoropolymer compositions advantageously yielding in appropriate conditions foams with high void content, low apparent density and uniform cells.

Further, in addition, the perfluoroalkoxysulphonic derivatives as above mentioned can be synthesized and isolated as pure materials with well defined chemical structure, while most commonly used telomer sulphonic acids of formula $F(CF_2)_n$—$CH_2CH_2SO_3X$, with n=6, 8, 10, 12 of the prior art are typically only available under then form of complex mixtures: possibility of finely controlling chemical structure of these compounds would enable predict and control with much more accuracy toxicological and environmental behaviour, which both are extremely sensitive to structural parameters.

The perfluoroalkoxysulphonic derivatives useful in the compositions of the invention preferably comply with formula:

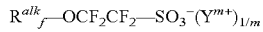

wherein $R^{alk}_f$ is a $C_1$-$C_{12}$ perfluoroalkyl group possibly comprising one or more ethereal oxygen atom, Y being $NH_4$ or an alkaline or alkali-earth metal cation and m being the valence of the cation Y.

Among classes of compounds which have been found particularly useful in the composition of the invention mention can be notably made of following compounds:

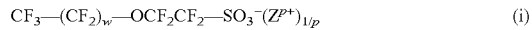 (i)

wherein w is an integer from 1 to 3, preferably w=1, and Z is $NH_4$ or a alkaline or alkali-earth metal cation, and p being the valence of the cation Z;

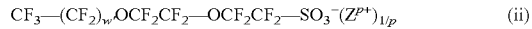 (ii)

wherein w' is an integer from 0 to 2, preferably w'=0, and Z is $NH_4$ or a alkaline or alkali-earth metal cation, and p being the valence of the cation Z; and

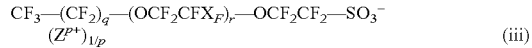 (iii)

wherein q and r being integers from 1 to 3, preferably q=1 and r=1, $X_F$ is F or $CF_3$ and Z is $NH_4$ or a alkaline or alkali-earth metal cation, and p being the valence of the cation Z.

Among said three classes of compounds, preferred compounds which have been used in the composition of the invention are those of formula (i):

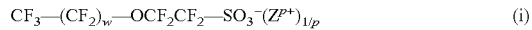 (i)

wherein w is an integer from 1 to 3, preferably w=1, and Z is $NH_4$ or a alkaline or alkali-earth metal cation, and p being the valence of the cation Z.

Non limitative examples of compounds which have been found useful to the purpose of the invention include notably $CF_3$—$CF_2$—$OCF_2CF_2$—$SO_3K$, $CF_3$—$CF_2$—$OCF_2CF_2$—$SO_3Na$, $CF_3$—$CF_2$—$OCF_2CF_2$—$SO_3NH_4$, $(CF_3$—$CF_2$—$OCF_2$ $CF_2$—$SO_3)_2Ba$, $(CF_3$—$CF_2$—$OCF_2CF_2$—$SO_3)_2Ca$, $CF_3$—$OCF_2CF_2$—$OCF_2CF_2$—$SO_3K$, $CF_3$—$OCF_2CF_2$—$OCF_2CF_2$—$SO_3Na$, $CF_3$—$OCF_2CF_2$—$OCF_2CF_2$—$SO_3NH_4$, $(CF_3$—$OCF_2CF_2$—$OCF_2CF_2$—$SO_3)_2Ba$, $(CF_3$—$OCF_2CF_2$—$OCF_2CF_2$—$SO_3)_2Ca$, $CF_3CF_2$—$OCF_2CF$ $(CF_3)$—$OCF_2CF_2$—$SO_3K$, $CF_3CF_2$—$OCF_2CF(CF_3)$—$OCF_2CF_2$—$SO_3Na$, $CF_3CF_2$—$OCF_2CF(CF_3)$—$OCF_2CF_2$—$SO_3NH_4$, $(CF_3CF_2$—$OCF_2CF(CF_3)$—$OCF_2CF_2$—$SO_3)_2Ba$ and $(CF_3CF_2$—$OCF_2CF(CF_3)$—$OCF_2CF_2$—$SO_3)_2Ca$.

Particularly good results have been obtained with compounds selected from the group consisting of $CF_3$—$CF_2$—$OCF_2CF_2$—$SO_3K$, $CF_3$—$CF_2$—$OCF_2CF_2$—$SO_3Na$, $CF_3$—$CF_2$—$OCF_2CF_2$—$SO_3NH_4$, $(CF_3$—$CF_2$—$OCF_2CF_2$—$SO_3)_2Ba$, and $(CF_3$—$CF_2$—$OCF_2CF_2$—$SO_3)_2Ca$.

The perfluoroalkoxysulphonic derivatives can be advantageously obtained from corresponding sulphonyl fluoride precursors by appropriate hydrolysis and/or neutralization procedures, as taught notably in BURDON, J., et al. Fluorinated sulphonic acids. Part I. Perfluoro-methane-, -octane- and -decane-sulphonic acids and their simple derivatives. *J. Chem. Soc.* 1957, p. 2574.

The perfluoroalkoxysulphonic derivative is generally used in the inventive composition in amounts of from 1 to about 3 000 ppm, preferably about 100 ppm to about 3 000 ppm, most preferably about 200 ppm to about 1500 ppm, by weight based on the total weight of the composition.

In the rest of the text, the expressions "fluoropolymer" and "polymer (A)" are understood, for the purposes of the invention, both in the plural and the singular, that is to say that the inventive composition may comprise one or more than one polymer (A).

Preferably, the composition of the invention comprises only one polymer (A).

The fluoropolymers useful in the present invention include all such resins which can be advantageously foamed by a gas injection process and/or by use of a chemical blowing agent. In particular, suitable thermoplastics fluoropolymers are those with a dielectric constant of advantageously less than 18, preferably less than 12. Especially suitable for making foamed electrical insulation by this invention are those fluoropolymers with a dielectric constant of less than 3.

The polymer (A) of the invention is a fluoropolymer, i.e. a polymer comprising recurring units derived from at least one fluorinated monomer.

Non limitative examples of suitable fluorinated monomers are notably:
- $C_2$-$C_8$ fluoro- and/or perfluoroolefins, such as tetrafluoroethylene (TFE), hexafluoropropene (HFP), pentafluoropropylene, and hexafluoroisobutylene;
- $C_2$-$C_8$ hydrogenated monofluoroolefins, such as vinyl fluoride; 1,2-difluoroethylene, vinylidene fluoride (VDF) and trifluoroethylene (TrFE);
- (per)fluoroalkylethylenes complying with formula $CH_2$=$CH$—$R_{f0}$, in which $R_{f0}$ is a $C_1$-$C_6$ (per)fluoroalkyl or a $C_1$-$C_6$ (per)fluorooxyalkyl having one or more ether groups;
- chloro- and/or bromo- and/or iodo-$C_2$-$C_6$ fluoroolefins, like chlorotrifluoroethylene (CTFE);
- fluoroalkylvinylethers complying with formula $CF_2$=$CFOR_{f1}$ in which $R_{f1}$ is a $C_1$-$C_6$ fluoro- or perfluoroalkyl, e.g. —$CF_3$, —$O_2F_5$, —$C_3F_7$;
- hydrofluoroalkylvinylethers complying with formula $CH_2$=$CFOR_{f1}$ in which $R_{f1}$ is a $C_1$-$C_6$ fluoro- or perfluoroalkyl, e.g. —$CF_3$, —$C_2F_5$, —$C_3F_7$;
- fluoro-oxyalkylvinylethers complying with formula $CF_2$=$CFOX_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;
- fluoroalkyl-methoxy-vinylethers complying with formula $CF_2$=$CFOCF_2OR_{f2}$ in which $R_{f2}$ is a $C_1$-$C_6$ fluoro- or perfluoroalkyl, e.g. —$CF_3$, —$C_2F_5$, —$C_3F_7$ or a $C_1$-$C_6$ (per)fluorooxyalkyl having one or more ether groups, like —$C_2F_5$—O—$CF_3$;
- functional fluoro-alkylvinylethers complying with formula $CF_2$=$CFOY_0$, in which $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;
- fluorodioxoles, of formula:

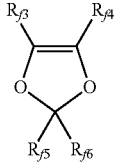

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Fluoropolymers which have been found particularly suitable for the compositions of the invention are per(halo)fluoropolymers; these materials are particularly advantageous when used in foamable compositions intended to be used for manufacturing foamed insulators (e.g. jackets or primaries for plenum cables, coaxial cables), due to their advantageous low flammability and outstanding dielectrical properties.

For the purpose of the invention, the term "per(halo)fluoropolymer" is intended to denote a fluoropolymer substantially free of hydrogen atoms.

The per(halo)fluoropolymer can comprise one or more halogen atoms (Cl, Br, I), different from fluorine.

The term "substantially free of hydrogen atom" is understood to mean that the per(halo)fluoropolymer consists essentially of recurring units derived from ethylenically unsaturated monomers comprising at least one fluorine atom and free of hydrogen atoms [per(halo)fluoromonomer (PFM)].

The per(halo)fluoropolymer can be a homopolymer of a per(halo)fluoromonomer (PFM) or a copolymer comprising recurring units derived from more than one per(halo)fluoromonomer (PFM).

Non limitative examples of suitable per(halo)fluoromonomers (PFM) are notably:
- $C_2$-$C_8$ perfluoroolefins, such as tetrafluoroethylene (TFE) and hexafluoropropene (HFP);
- chloro- and/or bromo- and/or iodo-$C_2$-$C_6$ per(halo)fluoroolefins, like chlorotrifluoroethylene;
- per(halo)fluoroalkylvinylethers complying with general formula $CF_2$=$CFOR_{f1}$ in which $R_{f1}$ is a $C_1$-$C_6$ per(halo)fluoroalkyl, such as —$CF_3$, —$C_2F_5$, —$C_3F_7$;
- per(halo)fluoro-oxyalkylvinylethers complying with general formula $CF_2$=$CFOX_{01}$, in which $X_{01}$ is a $C_1$-$C_{12}$ per(halo)fluorooxyalkyl having one or more ether groups, like perfluoro-2-propoxy-propyl group;
- per(halo)fluoro-methoxy-alkylvinylethers complying with general formula $CF_2$=$CFOCF_2OR_{f2}$ in which $R_{f2}$ is a $C_1$-$C_6$ per(halo)fluoroalkyl, such as —$CF_3$, —$C_2F_5$, —$C_3F_7$ or a $C_1$-$C_6$ per(halo)fluorooxyalkyl having one or more ether groups, such as —$C_2F_5$—O—$CF_3$; per(halo)fluorodioxoles of formula:

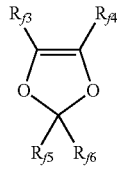

wherein each of $R_{f3}$, $R_{f4}$, $R_{f5}$, $R_{f6}$, equal of different each other, is independently a fluorine atom, a $C_1$-$C_6$ perfluoroalkyl group, optionally comprising one or more oxygen atom, e.g. —$CF_3$, —$C_2F_5$, —$C_3F_7$, —$OCF_3$, —$OCF_2CF_2OCF_3$; preferably a per(halo)fluorodioxole complying with formula here above, wherein $R_{f3}$ and $R_{f4}$ are fluorine atoms and $R_{f5}$ and $R_{f6}$ are perfluoromethyl groups (—$CF_3$) [perfluoro-2,2-dimethyl-1,3-dioxole (PDD)], or a per(halo)fluorodioxole complying with formula here above, wherein $R_{f3}$, $R_{f5}$ and $R_{f6}$ are fluorine atoms and $R_{f4}$ is a perfluoromethoxy group (—$OCF_3$) [2,2,4-trifluoro-5-trifluoromethoxy-1,3-dioxole or perfluoromethoxydioxole (MDO)].

The per(halo)fluoropolymer is advantageously chosen among copolymers of tetrafluoroethylene (TFE) with at least one per(halo)fluoromonomer (PFM) different from TFE.

The TFE copolymers as above detailed comprise advantageously at least 1.5% wt, preferably at least 5% wt, more preferably at least 7% wt of recurring units derived from the per(halo)fluoromonomer (PFM).

The TFE copolymers as above detailed comprise advantageously at most 30% wt, preferably at most 25% wt, more preferably 20% wt of recurring units derived from the per(halo)fluoromonomer (PFM).

Good results have been obtained with TFE copolymers as above detailed comprising at least 1.5% wt and at most 30% wt of recurring units derived from the per(halo)fluoromonomer (PFM).

Preferred per(halo)fluoropolymers [polymers (A)] are selected among TFE copolymers comprising recurring units derived from at least one per(halo)fluoromonomer (PFM) chosen among the group consisting of:
1. perfluoroalkylvinylethers complying with formula $CF_2=CFOR_{f1'}$, in which $R_{f1'}$ is a $C_1$-$C_6$ perfluoroalkyl, e.g. —$CF_3$, —$C_2F_5$, —$C_3F_7$; and/or
2. perfluoro-oxyalkylvinylethers complying with general formula $CF_2=CFOX_0$, in which $X_0$ is a $C_1$-$C_{12}$ perfluorooxyalkyl having one or more ether groups, like perfluoro-2-propoxy-propyl group; and/or
3. $C_3$-$C_8$ perfluoroolefins, such as hexafluoropropene (HFP); and/or
4. perfluorodioxoles of formula:

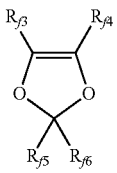

wherein each of $R_{f3}$, $R_{f4}$, $R_{f5}$, $R_{f6}$, equal of different each other, is independently a fluorine atom, a $C_1$-$C_6$ perfluoroalkyl group, optionally comprising one or more oxygen atom, e.g. —$CF_3$, —$C_2F_5$, —$C_3F_7$, —$OCF_3$, —$OCF_2CF_2OCF_3$.

More preferred per(halo)fluoropolymers are selected among TFE copolymers comprising recurring units derived from at least one per(halo)fluoromonomer (PFM) chosen among the group consisting of:
1. perfluoroalkylvinylethers complying with general formula $CF_2=CFOR_{f1}$ in which $R_{f1}$ is a $C_1$-$C_6$ perfluoroalkyl;
2. perfluoro-oxyalkylvinylethers complying with general formula $CF_2=CFOX_{01}$, in which $X_{01}$ is a $C_1$-$C_{12}$ perfluorooxyalkyl having one or more ether groups;
3. $C_3$-$C_8$ perfluoroolefins; and
4. mixtures thereof.

According to a first embodiment of the invention, the polymer (A) is chosen among TFE copolymers comprising recurring units derived from HFP and optionally from at least one per(halo)fluoroalkylvinylether, as above defined, preferably from at least one perfluoroalkylvinylether complying with general formula $CF_2=CFOR_{f1'}$ in which $R_{f1'}$ is a $C_1$-$C_6$ perfluoroalkyl.

Preferred polymers (A) according to this embodiment are selected among TFE copolymers comprising (preferably consisting essentially of) recurring units derived from tetrafluoroethylene (TFE) and hexafluoropropylene (HFP) in an amount ranging from 3 to 15 wt % and, optionally, from 0.5 to 3 wt % of at least one perfluoroalkylvinylether, as above defined.

The expression 'consisting essentially of' is used within the context of the present invention for defining constituents of a polymer to take into account end chains, defects, irregularities and monomer rearrangements which might be comprised in said polymers in minor amounts, without this modifying essential properties of the polymer.

A description of such polymers (A) can be found notably in U.S. Pat. No. 4,029,868 (DU PONT) 14 Jun. 1977, in U.S. Pat. No. 5,677,404 (DU PONT) 14 Oct. 1997, in U.S. Pat. No. 5,703,185 (DU PONT) 30 Dec. 1997, and in U.S. Pat. No. 5,688,885 (DU PONT) 18 Nov. 1997.

Polymer (A) according to this embodiment are commercially available under the trademark TEFLON® FEP 9494, 6100 and 5100 from E.I. DuPont de Nemours, or from Daikin (e.g. FEP NP-101 material), or from Dyneon LLC (FEP 6322).

Best results within this embodiment have been obtained with TFE copolymers comprising (preferably consisting essentially of) recurring units derived from tetrafluoroethylene (TFE) and hexafluoropropylene (HFP) in an amount ranging from 4 to 12 wt % and either perfluoro(ethyl vinyl ether) or perfluoro(propyl vinyl ether) in an amount from 0.5 to 3% wt.

According to a second embodiment of the invention, the polymer (A) is chosen among TFE copolymers comprising recurring units derived from at least one per(halo)fluoroalkylvinylether, as above defined, preferably from at least one perfluoroalkylvinylether, as above defined and optionally further comprising recurring units derived from $C_3$-$C_8$ perfluoroolefins.

Good results within this second embodiment have been obtained with TFE copolymers comprising recurring units derived from one or more than one perfluoroalkylvinylether as above specified; particularly good results have been achieved with TFE copolymers wherein the perfluoroalkylvinylether is perfluoromethylvinylether (of formula $CF_2=CFOCF_3$), perfluoroethylvinylether (of formula $CF_2=CFOC_2F_5$), perfluoropropylvinylether (of formula $CF_2=CFOC_3F_7$) and mixtures thereof.

According to a preferred variant of the second embodiment of the invention, the polymer (A) is advantageously a TFE copolymer consisting essentially of:
(a) from 3 to 13%, preferably from 5 to 12% by weight of recurring units derived from perfluoromethylvinylether;
(b) from 0 to 6% by weight of recurring units derived from one or more than one fluorinated comonomer different from perfluoromethylvinylether and selected from the group consisting of perfluoroalkylvinylethers complying with general formula $CF_2=CFOR_{f1'}$ in which $R_{f1'}$ is a $C_1$-$C_6$ perfluoroalkyl and perfluoro-oxyalkylvinylethers complying with general formula $CF_2=CFOX_{01'}$, in which $X_{01'}$ is a $C_1$-$C_{12}$ perfluorooxyalkyl having one or more ether groups; preferably derived from perfluoroethylvinylether and/or perfluoropropylvinylether;
(c) recurring units derived from tetrafluoroethylene, in such an amount that the sum of the percentages of the recurring units (a), (b) and (c) is equal to 100% by weight.

MFA and PFA suitable to be used for the composition of the invention are commercially available from Solvay Solexis Inc. under the trade name of HYFLON® PFA P and M series and HYFLON® MFA.

According to another preferred variant of this second embodiment of the invention, the polymer (A) is advantageously a TFE copolymer consisting essentially of:
(a) from 0.5 to 5% by weight of recurring units derived from perfluoromethylvinylether;
(b) from 0.4 to 4.5% by weight of recurring units derived from one or more than one fluorinated comonomer different from perfluoromethylvinylether and selected from the group consisting of perfluoroalkylvinylethers, as above detailed and/or perfluoro-oxyalkylvinylethers, as above detailed; preferably derived from perfluoroethylvinylether and/or perfluoropropylvinylether;
(c) from 0.5 to 6% weight of recurring units derived from at least one $C_3$-$C_8$ perfluoroolefins, preferably derived from hexafluoropropylene; and
(d) recurring units derived from tetrafluoroethylene, in such an amount that the sum of the percentages of the recurring units (a), (b), (c) and (d) is equal to 100% by weight.

For the purpose of the present invention, by the term "melt-processible" is meant that the polymer (A) can be processed (i.e. fabricated into shaped articles such as films, fibers, tubes, fittings, wire coatings and the like) by conventional melt extruding, injecting or casting means. This generally requires that the melt viscosity at the processing temperature be no more than $10^8$ Pa×sec, preferably from 10 to $10^6$ Pa×sec.

The melt viscosity of the polymer (A) can be measured according to ASTM D-1238, using a cylinder, orifice and piston tip made of a corrosion-resistant alloy, charging a sample into the 9.5 mm inside diameter cylinder which is maintained at a temperature exceeding melting point, extruding the sample through a 2.10 mm diameter, 8.00 mm long square-edged orifice under a load (piston plus weight) of 5 kg. Melt viscosity is calculated in Pa×sec from the observable extrusion rate in grams per minute.

Also, polymer (A) typically has a dynamic viscosity at a shear rate of 1 rad x $sec^{-1}$ and at a temperature exceeding melting point of about 30° C., preferably at a temperature of $T_{m2}$+(30±2° C.) is comprised between 10 and $10^6$ Pa×sec, when measured with a controlled strain rheometer, employing an actuator to apply a deforming strain to the sample and a separate transducer to measure the resultant stress developed within the sample, and using the parallel plate fixture.

The polymer (A) of the invention is advantageously thermoplastic.

The term "thermoplastic" is understood to mean, for the purposes of the present invention, polymers existing, at room temperature (25° C.), below their melting point if they are semi-crystalline, or below their $T_g$ if amorphous. These polymers have the property of becoming soft when they are heated and of becoming rigid again when hey are cooled, without there being an appreciable chemical change. Such a definition may be found, for example, in the encyclopedia called "Polymer Science Dictionary", Mark S. M. Alger, London School of Polymer Technology, Polytechnic of North London, UK, published by Elsevier Applied Science, 1989.

Preferably, the polymer (A) is semi-crystalline.

The term "semi-crystalline" is intended to denote a polymer having a heat of fusion of more than 1 J/g when measured by Differential Scanning calorimetry (DSC) at a heating rate of 10° C./min, according to ASTM D 3418.

Preferably, the semi-crystalline polymer (A) of the invention has a heat of fusion of at least 3 J/g, more preferably of at least 5 J/g, most preferably at least 10 J/g.

The composition of the present invention preferably comprises also a processing aid, which facilitate processing and improve surface aspect. Processing aids for fluoropolymers well-known to those skilled in the art can be used. Materials which have been found to yield particularly good results in the composition of the invention are processing aids based on polyolefin polymers, in particular on polyethylene polymers, more precisely on functionalized polyethylene polymers comprising acid functionalities, e.g. ethylene/acrylic acid copolymers, in general salified with appropriate salts. These materials, generally referred to as polyethylene ionomers, are notably commercially available under the trade mark ACIyn® from Honeywell. The use of salified polyethylene ionomers is particularly advantageous, in particular in combination with copolymers of ethylene and chlorotrifluoroethylene, as these materials further cooperates in capturing acidity optionally generated during melt processing of the composition of the invention.

Further, in addition, certain TFE copolymers having low melt viscosities can be further used as processing aids in the composition of the invention. Said processing aids are notably described in EP 2013284 A (SOLVAY SOLEXIS SPA) 14 Jan. 2009, the disclosures of which are hereby incorporated by reference.

The composition of the present invention generally further contains at least one additional nucleating agent ingredient different from the perfluoroalkoxysulphonic derivative. There can be up to 30 parts of this additional nucleating agent, preferably from 0.01 to 1, more preferably from 0.01 to 0.6 weight parts of this latter per hundred weight parts of polymer (A). Said additional nucleating agent ingredient can be notably titanium dioxide, boron nitride, talc and the like. Nanosized (i.e. having an average particle size of less than 100 nm) nucleating agent ingredients will be generally preferred for their higher effectiveness.

According to an embodiment of the invention, the composition further comprises, as additional nucleating agent ingredient, titanium dioxide, and optionally at least one inorganic salt selected from the group consisting of lithium carbonate, calcium carbonate, calcium tetraborate, strontium carbonate, sodium carbonate, sodium tetraborate ($Na_2B_4O_7$), sodium sulfite, potassium tetraborate potassium pyrosulfate, potassium sulfate, barium nitrate, aluminum phosphate, sodium fluorosilicate and combinations thereof.

The Applicant has surprisingly found that above mentioned ingredients can be used with success also in the composition of the invention, in combination with above described perfluoroalkoxysulphonic acid salts, in particular for the physical foaming of fluoropolymers using gaseous nitrogen as blowing agent.

The additional nucleating agent ingredients of this embodiment preferably are used in the following amounts: 50 ppm to about 2 000 ppm of titanium dioxide by weight based on the total weight of the composition; about 25 ppm to about 3 000 ppm of the inorganic salt selected from the group consisting of lithium carbonate, calcium carbonate, calcium tetraborate, strontium carbonate, sodium carbonate sodium tetraborate, sodium sulfite, potassium tetraborate potassium pyrosulfate, potassium sulfate, barium nitrate, aluminum phosphate, sodium fluorosilicate and combinations thereof by weight based on the total weight of the composition.

Sodium tetraborate ($Na_2B_4O_7$) and calcium tetraborate ($CaB_4O_7$), however, are preferred, with sodium tetraborate being particularly preferred.

The present invention also concerns a process for the manufacture of the foamable composition as above detailed.

Generally, the process of the invention comprises blending of the polymer (A) and the perfluoroalkoxysulphonic derivative.

Blending said ingredients in powder form can be advantageously comprised in the process of the invention, according to an embodiment.

To this aim, the polymer (A) to be used in the process of the invention is generally under the form of a powder having an average particle size comprised advantageously between 1 and 2500 µm, preferably between 50 and 1500 µm.

Typically, according to this embodiment, the composition of the invention can be manufactured as a powder mixture by dry blending the polymer (A), and the perfluoroalkoxysulphonic derivative, and all other optional ingredients, as above details, using high intensity mixers. Henschel-type mixers and ribbon mixer can be notably used.

Among additional ingredients, mention can be notably made of additional nucleating agents, as above detailed, or chemical blowing agents.

So obtained powder mixture can comprise the polymer (A), and the perfluoroalkoxysulphonic derivative in the weight ratios as above detailed, suitable for obtaining effective foaming, or can be a concentrated mixture to be used as masterbatch and diluted in further amounts of polymer (A) in subsequent processing steps.

It is also possible to manufacture the composition of the invention by further melt compounding the powder mixture as above described with or without an additional quantity of polymer (A).

It is generally preferred to incorporate the powder mixture as above described in an additional quantity of polymer (A).

The method for manufacturing the foamable composition as above detailed advantageously comprises melt compounding. As said, melt compounding can be effected on the powder mixture as above detailed, or directly on polymer (A), the perfluoroalkoxysulphonic derivative and any other possible ingredient.

Conventional melt compounding devices can be used. Preferably, extruders, more preferably twin screw extruders can be used.

When foamable fluoropolymer composition of the invention is intended for chemical foaming, that is to say it advantageously comprises a chemical blowing agent suitable for decomposing and liberating gas during processing, specially designed extruders, i.e. extruders specifically designed to effectively control temperature such that foaming or nucleation is not prematurely initiated and such that the composition may be melted, blended, extruded and palletized without premature foaming of the composition, are particularly preferred.

The design of the compounding screw, e.g. flight pitch and width, clearance, length as well as operating conditions will be advantageously chosen so that sufficient heat and mechanical energy is provided to advantageously fully melt the powder mixture or the ingredients as above detailed and advantageously obtain a homogeneous distribution of the different ingredients, but still mild enough to advantageously keep the processing temperature of the composition below that in which foaming may be prematurely initiated, in case chemical foaming ingredients are comprised in the composition.

Provided that the processing temperature is kept above the melting point of the polymer (A) and, in case of chemical foaming, below the decomposition temperature of the chemical blowing agent, it is advantageously possible to obtain strand extrudates of the composition of the invention which have not undergone significant foaming. Such strand extrudates can be chopped by means e.g. of a rotating cutting knife aligned downwards the die plate, generally with an underwater device, which assures perfect cutting knife to die plate alignment, and collected under the form of pellets, which can be used for the manufacture of final foamed parts.

The invention further pertains to a process for making a foamed fluoropolymer by foaming the foamable composition, as above detailed.

Foaming is generally achieved in this process of the invention by a continuous gas injection process using a gaseous component, typically chlorodifluoromethane (F-22), nitrogen, carbon dioxide, or other gas or gas mixture which is soluble in the molten resin, typically using an extruder equipped with suitable gas injectors and designed for operating under pressure In such processes the gas advantageously dissolves in the molten resin inside the extruder. Absorption is generally believed to follow Henry's Gas Law which states that the equilibrium value of the mole fraction of gas dissolved in a liquid is directly proportional to the partial pressure of the gas above the liquid surface. Thus, by adjusting the gas pressure in the extruder, the amount of gas dissolved in the melt can be advantageously controlled. Generally, the greater the amount of gas dissolved in the melt, the greater the void volume in the resulting foam. Chlorodifluoromethane (F-22) and nitrogen are especially suited for foaming because they easily dissolve in molten fluoropolymer resins, and their thermal stability is adequate to survive the holdup time in the extruder when mixed with molten resin at temperatures up to 380° C.

As an alternative process, foaming can be achieved by incorporating in the composition of the invention a chemical blowing agent (a chemical which is unstable at the polymer processing temperature and liberates a gas, such as nitrogen, carbon dioxide or hydrogen). In this case, once the chemical blowing agent reaches processing temperature in the extruder, decomposition thereof is triggered and the blowing agent which causes bubble formation is provided in situ.

In both processes, foam cell formation actually starts generally shortly after the molten composition containing the blowing agent dissolved therein passes out of the extrusion die. The gas dissolved in the molten composition typically comes out of molten mass because of the sudden drop in melt pressure as the extrudate exits the extrusion die.

Typically, extrusion speed and drawdown parameters are adjusted for influencing foaming. The skilled in the art would determine using standard techniques and routine work, temperature, power and residence time of the composition in the extruder so as to obtain final foamed parts having the desired void fraction or foaming level.

The foamed fluoropolymer is then solidified when the extrudate advantageously enters in a cooling trough, typically a water bath, stopping foam cell growth.

Still an object of the invention is a foamed fluoropolymer article obtained from the foaming process as above detailed.

As a function of the extruder die, several different foamed parts can be obtained, including separators, wire insulators, jackets and the like.

Should the disclosure of any patents, patent applications, and publications which are incorporated herein by reference conflict with the description of the present application to the extent that it may render a term unclear, the present description shall take precedence.

The invention will be now described in more details with reference to the following examples, whose purpose is merely illustrative and not intended to limit the scope of the invention.

Raw Materials

HYFLON® MFA 1041 is a TFE/MVE copolymer having a melting point of 280-290° C. and a MFI of 22-28 g/10 min (372° C./5 Kg)

HYFLON® PFA P450 is a TFE/PVE copolymer having a melting point 300-310° C. and MFI 10-17 g/10 min (372° C./5 Kg)

ZONYL® BAS salt is a barium salt of ZONYL® TBS having formula: $(F-(CF_2-CF_2)_n-CH_2CH_2-SO_3)_2Ba$, wherein n=1 to 9, commercially available from DuPont Specialty Chemicals Division.

TiO$_2$, TI-PURE Grade R900, commercially available from DuPont.

Borax (sodium tetraborate), commercially available.

Preparative Example 1

Synthesis of CF$_3$—CF$_2$—OCF$_2$CF$_2$—SO$_3$K
(K-nucl, Hereinafter)

In a 250 ml round-bottom glass flask in the following order were introduced placed 12.4 g of KOH 86%, 126 g of de-mineralized water and 27.6 g of neat 2-perfluoroethoxy-ethylsulfonylfluoride (C$_4$F$_{10}$SO$_3$). The flask was closed with a screw-cap and then heated with stirring at 55° C. for 30 minutes. Upon completion of the reaction, the reaction mixture turned into a single aqueous phase. Heating and stirring were set off and the reactor was left cooling slowly to room temperature. The product crystallized spontaneously in white needles and was recovered by filtration, rinsed with cold water and dried in air. 28.8 g of substantially pure CF$_3$—CF$_2$—OCF$_2$CF$_2$—SO$_3$K were recovered.

Preparative Example 2

Synthesis of (CF$_3$—CF$_2$—OCF$_2$CF$_2$—SO$_3$)$_2$Ba
(Ba-nucl, Hereinafter)

In a 1 L round-bottom glass flask in the following order were introduced 830 g of an aqueous solution of Ba(OH)$_2$ at 1.63% wt, and 20.0 g of neat 2-perfluoroethoxyethylsulfo-nylfluoride. The flask was closed with a screw-cap and heated with stirring at 64° C. for 72 hours. Upon completion of the reaction, heating and stirring were set off and the reactor was left cooling to room temperature. The solution is filtered and 6.7 g of fine white powdery precipitate was removed and identified as BaF 2.

The aqueous phase was then reduced in volume by stepwise evaporation and removal of BaF$_2$. Thus, in a first step, the volume was reduced by evaporating about 35% of the initial liquid volume. Upon cooling additional 2.1 g of a white solid precipitate, found to be BaF$_2$, were removed.

In a second step the volume was reduced by evaporating about 70% of the initial liquid volume. Upon cooling additional 5.5 g of the white solid, found to be a mixture of BaF$_2$ (about 10% wt) and Ba-nucl (about 90% wt), were removed.

In a third step the volume was reduced by evaporating about 94% of the initial liquid volume. Upon cooling, 10.1 g of a white solid precipitate were recovered. This material was found to be the expected (CF$_3$—CF$_2$—OCF$_2$CF$_2$—SO$_3$)$_2$Ba, containing as impurity about 0.33% wt BaF$_2$. Purification by re-crystallization from icy-water of the highly soluble material as above detailed enabled obtaining pure (CF$_3$—CF$_2$—OCF$_2$CF$_2$—SO$_3$)$_2$Ba under the form of white crystals sheets.

General Procedure for the Manufacture of Foamable Compositions

Foamable compositions were manufactured at lab scale following above detailed procedure:
1. All ingredients in powder form are dry mixed in a roll mill;
2. The powder mixture is introduced in a mixer (Brabender 50 EHT) electrically heated at 320° C. and compounded under stirring, generally at a speed rate of from 30 to 50 rpm. The molten composition was mixed for some minutes (usually 5-6) and then quickly unloaded.
3. The so obtained composition was then compression moulded in a press platen at 340° C. in order to obtain plaques having thickness of 1.5 mm. Pressure is carefully controlled for reducing any premature foaming of the material. Finally, from the plaques small disks specimens were cut off.

General Procedure for Bench Scale Foaming of Foamable Compositions

For screening foaming compositions, a bench scale foaming device consisting of:
1. High pressure-high temperature chamber equipped with inlet and outlet valves
2. Pressure gauge
3. Line for cold gas was used. FIG. 1 shows a schematic sketch of the experimental apparatus. The temperature inside the chamber was controlled by a PID system. In the chamber, three small disk-shaped specimens made from the composition (diameter 22 mm; height=1.5 mm) were introduced for each foaming experiment. The chamber was equipped with a pressure gauge for a precise control of the pressure and with two valves for regulating nitrogen flow.

Once the specimens placed in the chamber, the temperature was raised at the set-point value (usually 320° C.) for melting the composition. The chamber was then pressurized (usually 65 bar) for 5 minutes to allow the gas to completely dissolve into the molten material. Finally, the outlet valve was quickly opened releasing the gas within 3 seconds. The rapid pressure drop inside the chamber caused foaming to occur in the sample. The resistance of the gas exit path was maintained constant for all the experiments, so the pressure drop rate was not changed, thus allowing a comparison of different materials and formulations.

Immediately after depressurization, cold nitrogen gas was flushed from the inlet valve in order to "freeze" the foamed structure. The temperature was quickly lowered below the melting temperature of the fluoropolymer.

When the chamber reached room temperature, the autoclave was opened and the samples removed. Apparent density of foamed samples was thus determined. Micrographs were also taken from foamed specimens, for obtaining complementary information regarding shape and number of bubbles created in the polymer matrix.

General Procedure for the Manufacture of Foamed Sheathing from the Foamable Composition in a W&C Line The ingredients of the formulation were dry blended in a Henschel-type mixer (turbo mixer) at 30 rpm for 15 min. Afterwards, this powder was pelletized in a Brabender conical twin screw extruder; the temperatures were set in order to prevent a premature foaming, for this reason the melt temperature was about 310° C. and the screw speed was about 15 rpm. The so obtained pellets of the foamable thermoplastic formulations were fed to (Wire & Cable) W&C line.

The W&C line used was an ITAL line equipped with a Sterling extruder having a diameter of 38 mm and a length to diameter ratio of 30.

The foamable compositions were used for sheathing an AWG24 cable, using a low DDR (less than 20) with an insulation thickness of about 0.25-0.30 mm. The melt temperature was found to be in the range 390-400° C.

For achieving physical foaming, nitrogen was injected into the barrel at a pressure of about 200 bar higher than the actual extruder pressure. The line speed was about 50 m/min and the sheathed cable was cooled in air before entering a final cooling bath.

Under these conditions the density of the insulation sheath was found to decrease from about 2.1 g/cm³ (corresponding to an unfoamed/dense insulation) to lower values, down to about 1.1 g/cm³, the lower the density, the more effective being the foaming formulation. The density of the foamed insulation was measured by cutting a length of insulated conductor, withdrawing the inner copper wire and submitting the same to measurement according to ASTM D 792; so as to ensure minimization of air bubbles in the inner void of the cable, before immerging the specimen in water, water was injected with a syringe in the inner cylindrical cavity left from the wire.

Results of both foaming tests performed at the bench scale and in the W&C line are summarized in Table 1 herein below, together with ingredients of the foamable compositions used.

In the compositions, base fluoropolymer used was HYFLON® MFA 1041 or HYFLON® PFA P450; these bare polymer were compounded with 250 μm of TiO₂ and 100 ppm of borax and the amounts detailed in the table of the thereby specified nucleating agent.

TABLE 2

| Run | Fluoro-polymer type | Nucleating agent type | ppm | Density of foamed sheath from W&C line g/cm³ | Density of foam from bench scale test g/cm³ |
|---|---|---|---|---|---|
| 1C | MFA 1041 | Zonyl® BAS | 750 | 1.6 | 1 |
| 2 | MFA 1041 | Ba-nucl | 680 | 1.7 | |
| 3 | MFA 1041 | Ba-nucl | 970 | 1.4 | 0.8 |
| 4 | MFA 1041 | K-nucl | 450 | 1.7 | 1.1 |
| 5 | MFA 1041 | K-nucl | 580 | 1.12 | |
| 6 | PFA P450 | K-nucl | 580 | 1.2 | |

Data provided in Table 1 well demonstrate that the use of perfluoroalkoxysulphonic derivative as nucleating agents in the composition according to the invention enables achieving foam density similar to those achieved using ZONYL® BAS at similar or even lower concentrations.

Further in addition, when increasing concentration of said nucleating agents, extremely low foam densities are achieved, representative of a high void content, with a very regular cell structure.

The invention claimed is:

1. A foamable thermoplastic fluoropolymer composition comprising:
   at least one melt-processable fluoropolymer [polymer (A)]; and
   at least one perfluoroalkoxysulphonic derivative selected from the following compounds:

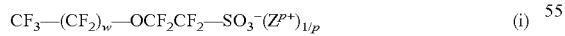

$$CF_3-(CF_2)_w-OCF_2CF_2-SO_3^-(Z^{p+})_{1/p} \quad \text{(i)}$$

wherein w is an integer from 1 to 3, Z is NH₄ or an alkaline or alkali-earth metal cation, and p is the valence of the cation Z;

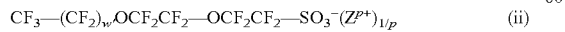

$$CF_3-(CF_2)_{w'}OCF_2CF_2-OCF_2CF_2-SO_3^-(Z^{p+})_{1/p} \quad \text{(ii)}$$

wherein w' is an integer from 0 to 2, Z is NH₄ or an alkaline or alkali-earth metal cation, and p is the valence of the cation Z; and

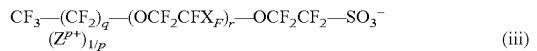

$$CF_3-(CF_2)_q-(OCF_2CFX_F)_r-OCF_2CF_2-SO_3^-(Z^{p+})_{1/p} \quad \text{(iii)}$$

wherein q and r are each independently an integer from 1 to 3, $X_F$ is F or $CF_3$, Z is NH₄ or an alkaline or alkali-earth metal cation, and p is the valence of the cation Z.

2. The foamable thermoplastic fluoropolymer composition of claim 1, wherein the perfluoroalkoxysulphonic derivative is selected from the group consisting of the following compounds: $CF_3-CF_2-OCF_2CF_2-SO_3K$, $CF_3-CF_2-OCF_2CF_2-SO_3Na$, $CF_3-CF_2-OCF_2CF_2-SO_3NH_4$, $(CF_3-CF_2-OCF_2CF_2-SO_3)_2Ba$, $(CF_3-CF_2-OCF_2CF_2-SO_3)_2Ca$, $CF_3-OCF_2CF_2-OCF_2CF_2-SO_3K$, $CF_3-OCF_2CF_2-OCF_2CF_2-SO_3Na$, $CF_3-OCF_2CF_2-OCF_2CF_2-SO_3NH_4$, $(CF_3-OCF_2CF_2-OCF_2CF_2-SO_3)_2Ba$, $(CF_3-OCF_2CF_2-OCF_2CF_2-SO_3)_2Ca$, $CF_3CF_2-OCF_2CF(CF_3)-OCF_2CF_2-SO_3K$, $CF_3CF_2-OCF_2CF(CF_3)-OCF_2CF_2-SO_3Na$, $CF_3CF_2-OCF_2CF(CF_3)-OCF_2CF_2-SO_3NH_4$, $(CF_3CF_2-OCF_2CF(CF_3)-OCF_2CF_2-SO_3)_2Ba$ and $(CF_3CF_2-OCF_2CF(CF_3)-OCF_2CF_2-SO_3)_2Ca$.

3. The foamable thermoplastic fluoropolymer composition according to claim 1 wherein the perfluoroalkoxysulphonic derivative from 1 to about 3 000 ppm, by weight based on the total weight of the composition.

4. The foamable thermoplastic fluoropolymer composition according to claim 1 wherein said polymer (A) is a polymer comprising recurring units derived from at least one fluorinated monomer selected from the group consisting of:
   $C_2$-$C_8$ fluoro- and/or perfluoroolefins;
   $C_2$-$C_8$ hydrogenated monofluoroolefins;
   (per)fluoroalkylethylenes complying with formula $CH_2=CH-R_{f0}$, wherein $R_{f0}$ is a $C_1$-$C_6$ (per)fluoroalkyl or a $C_1$-$C_6$ (per)fluorooxyalkyl having one or more ether groups;
   chloro- and/or bromo- and/or iodo-$C_2$-$C_6$ fluoroolefins;
   fluoroalkylvinylethers complying with formula $CF_2=CFOR_{f1}$ wherein $R_{f1}$ is a $C_1$-$C_6$ fluoro- or perfluoroalkyl;
   hydrofluoroalkylvinylethers complying with formula $CH_2=CFOR_{f1}$ wherein $R_{f1}$ is a $C_1$-$C_6$ fluoro- or perfluoroalkyl;
   fluoro-oxyalkylvinylethers complying with formula $CF_2=CFOX_0$, wherein $X_0$ is a $C_1$-$C_{12}$ oxyalkyl, or a $C_1$-$C_{12}$ (per)fluorooxyalkyl having one or more ether groups;
   fluoroalkyl-methoxy-vinylethers complying with formula $CF_2=CFOCF_2OR_{f2}$ wherein $R_{f2}$ is a $C_1$-$C_6$ fluoro- or perfluoroalkyl or a $C_1$-$C_6$ (per)fluorooxyalkyl having one or more ether groups;
   functional fluoro-alkylvinylethers complying with formula $CF_2=CFOY_0$, wherein $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form; and
   fluorodioxoles, of formula:

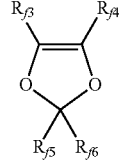

wherein each of $R_{f3}$, $R_{f4}$, $R_{f5}$, $R_{f6}$, equal to or different from each other, is independently a fluorine atom, a $C_1$-$C_6$ fluoro- or per(halo)fluoroalkyl, optionally comprising one or more oxygen atom.

5. The foamable thermoplastic fluoropolymer composition according to claim 4, wherein said polymer (A) is a per(halo)fluoropolymer substantially free from hydrogen atoms.

6. The foamable thermoplastic fluoropolymer composition according to claim 4, wherein said polymer (A) is a homopolymer of a per(halo)flaoromonomer (PFM) or a copolymer comprising recurring units derived from more than one per(halo)fluoromonomer (PFM), said per(halo)fluoromoncaner (PPM) being selected from the group consisting of:

$C_2$-$C_8$ perfluaroolefins;

chloro- and/or bromo- and/or iodo- $C_2$-$C_6$ per(halo)fluoroolefins;

per(halo)fluoroalkylvinylethers complying with general formula $CF_2{=}CFOR_{f1}$ wherein $R_{f1}$ is a $C_1$-$C_6$ por(halo)fluoroalkyl;

per(halo)fluoro-oxyalkylvinylethers complying with general formula $CF_2{=}CFOX_{01}$, wherein $X_{01}$ is a $C_1$-$C_{12}$ per(halo)fluorooxyalkyl having one or more ether groups;

per(halo)fluoro-methoxy-alkylvinylethers complying with general formula $CF_2{=}CFOCF_2OR_{f2}$ wherein $R_{f2}$ is a $C_1$-$C_6$ per(halo)fluoroalkyl or a $C_1$-$C_6$ per(halo)fluorooxyalkyl having one or more ether groups;

per(halo)fluorodioxoles of formula:

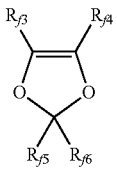

wherein each $R_{f3}$, $R_{f4}$, $R_{f5}$, $R_{f6}$, equal to or different from each other, is independently a fluorine atom, a $C_1$-$C_6$, perfluoroalkyl group, optionally comprising one or more oxygen atom.

7. The foamable thermoplastic fluoropolymer composition according to claim 6, wherein said polymer (A) is a TFE copolymer comprising recurring units derived from at least one per(halo)fluoromonomer (PFM) selected from the group consisting of:

1. per(halo)fluoroalkylvinyiethers complying with general formula $CF_2{=}CFOR_{f1}$ wherein $R_{f1}$ is a $C_1$-$C_6$ per(halo)fluoroalkyl;
2. per(halo)fluoro-oxyalkylvinylethers complying with general formula $CF_2{=}CFOX_{01}$, wherein $X_{01}$ is a $C_1$-$C_{12}$ per(halo)fluorooxyalkyl having one or more ether groups;
3. $C_3$-$C_8$ perfluoroolefins; and
4. mixtures thereof.

8. The foamable thermoplastic fluoropolymer composition according to claim 7, wherein said polymer (A) is selected from the group consisting of TFE copolymers consisting essentially of recurring units derived from tetrafluoroethylene (TFE) and hexafluoropropylene (HFP) in an amount ranging from 3 to 15 wt % and, optionally, from 0.5 to 3 wt % of at least one perfluoroalkylvinylether complying with general formula $CF_2{=}CFOR_{f1}$ wherein $R_{f1}$ is a $C_1$-$C_6$ perlluoroalkyl.

9. The foamable thermoplastic fluoropolymer composition according to claim 7, wherein said polymer (A) is a TFE copolymer consisting essentially of:
(a) from 3 to 13% by weight of recurring units derived from perfluoromethylvinylether;
(b) from 0 to 6% by weight of recurring units derived from one or more than one fluorinated comonomer different from perfluoromethylvinylether and selected from the group consisting of perfluoroalkylvinylethers complying with general formula $CF_2{=}CFOR_{f1}$, wherein $R_{f1}$, is a $C_1$-$C_6$ perfluoroalkyl and perfluorooxyakylvinylethers complying with general formula $CF_2{=}CVOX_{01'}$, wherein $X_{01'}$ is a $C_1$-$C_{12}$ perfluorooxyalkyl having one or more ether groups; and
(c) recurring units derived from tetrafluoroethylene, in such an amount that the sum of the percentages of the recurring units (a), (b) and (c) is equal to 100% by weight.

10. The foamable thermoplastic fluoropolymer composition according to claim 7, wherein said polymer (A) is a TFE copolymer consisting of:
(a) from 0.5 to 5% by weight of recurring units derived from perfluorornethylvinylether;
(b) from 0.4 to 4.5% by weight of recurring units derived from one or more than one fluorinated comonomer different from perfluoromethylvinylether and selected from the group consisting of perfluoroalkylvinylethers complying with general formula $CF_2{=}CFOR_{f1}$, wherein $R_{f1}$, is a $C_1$-$C_6$ perfluoroalkyl and perfluorooxyalkylvinylethers complying with general formula $CF_2{=}CFOX_{01'}$, wherein $X_{01'}$ is a $C_1$-$C_{12}$ perfluorooxyalkyl having one or more ether groups;
(c) from 0.5 to 6% weight of recurring units derived from at least one $C_3$-$C_8$ perfluoroolcfins; and
(d) recurring units derived from tetrafluoroethylene, in such an amount that the sum of the percentages of the recurring units (a), (b), (c) and (d) is equal to 100% by weight.

11. The foamable thermoplastic fluoropolymer composition according to claim 1, further containing at least one additional nucleating agent ingredient different from the perfluoroalkoxysulphonic derivative.

12. The foamable thermoplastic fluoropolymer composition according to claim 11, said composition further comprising titanium dioxide, and optionally at least one inorganic salt selected from the group consisting of lithium carbonate, calcium carbonate, calcium telraborate, strontium carbonate, sodium carbonate, sodium tetraborate ($Na_2B_4O_7$), sodium sulfite, potassium tetraborate potassium pyrosulfate, potassium sulfate, barium nitrate, aluminum phosphate, sodium fluorosilicate and combinations thereof.

13. A process for the manufacture of the foamable composition according to claim 1, said process comprising the step of blending the polymer (A) and the perfluoroalkoxysulphonie derivative.

14. A process for making a foamed fluoropolymer by foaming the foamable composition according to claim 1.

15. A foamable thermoplastic fluoropolymer composition consisting essentially of:
at least one melt-processible fluoropolymer [polymer (A)]; and
at least one perfluoroalkoxysulphonic derivative selected from the following compounds:

$$CF_3{-}(CF_2)_w{-}OCF_2CF_2{-}SO_3{-}(Z_{p+})_{1/p} \qquad (i)$$

wherein w is an integer from 1 to 3, Z is $NH_4$ or an alkaline or alkali-earth metal cation, and p is the valence of the cation Z;

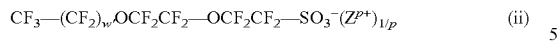 (ii)

wherein w' is an integer from 0 to 2, Z is $NH_4$ or an alkaline or alkali-earth metal cation, and p is the valence of the cation Z; and

 (iii)

wherein q and r are each independently an integer from 1 to 3, $X_F$ is F or $CF_3$, Z is $NH_4$ or an alkaline or alkali-earth metal cation, and p is the valence of the cation Z; and optionally, at least one additional nucleating agent selected from titanium dioxide, lithium carbonate, calcium carbonate, calcium tetraborate, strontium carbonate, sodium carbonate, sodium tetraborate, sodium sulfite, potassium tetraborate potassium pyrosulfate, potassium sulfate, barium nitrate, aluminum phosphate, sodium fluorosilicate and combinations thereof.

* * * * *